Patented Feb. 26, 1952

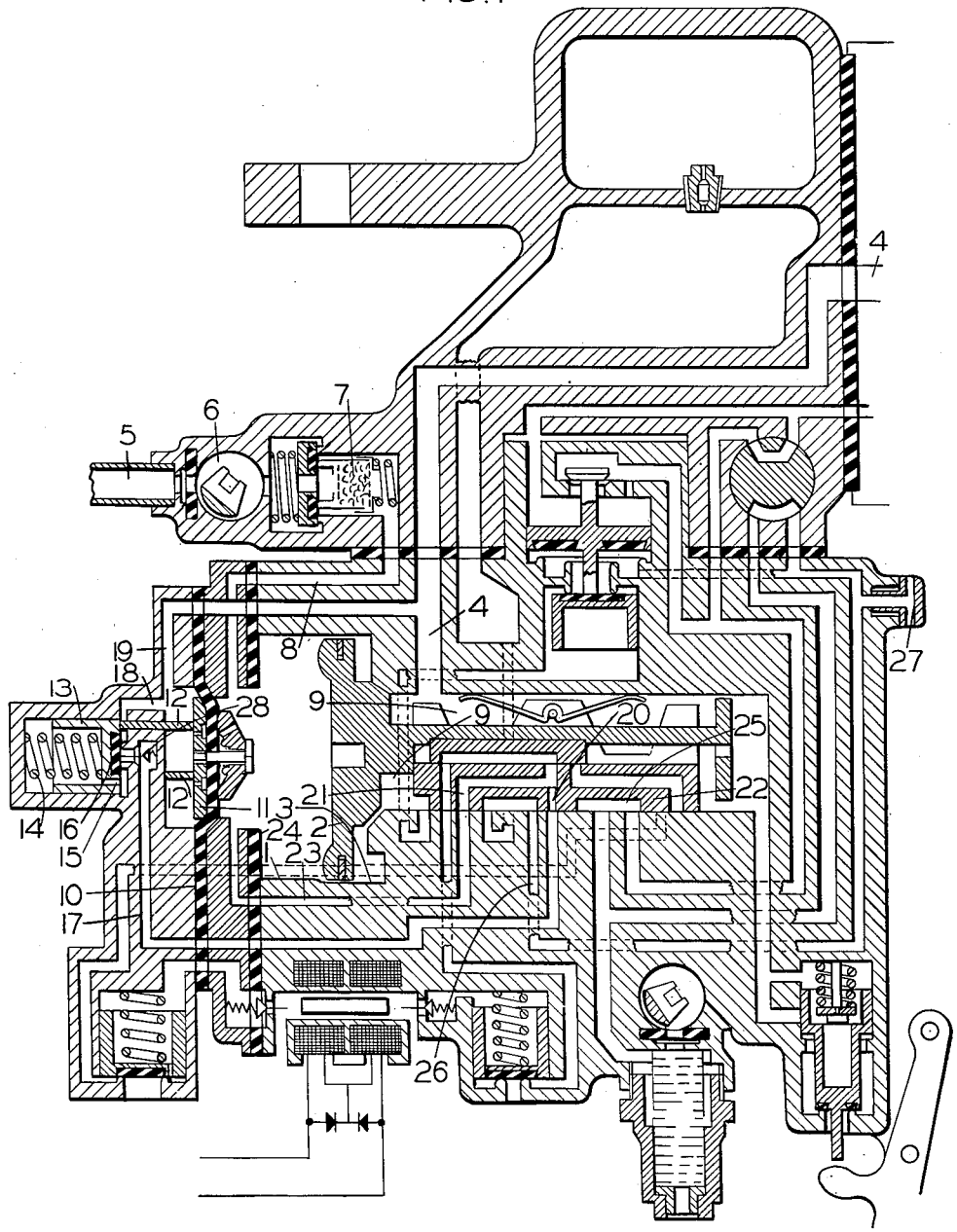

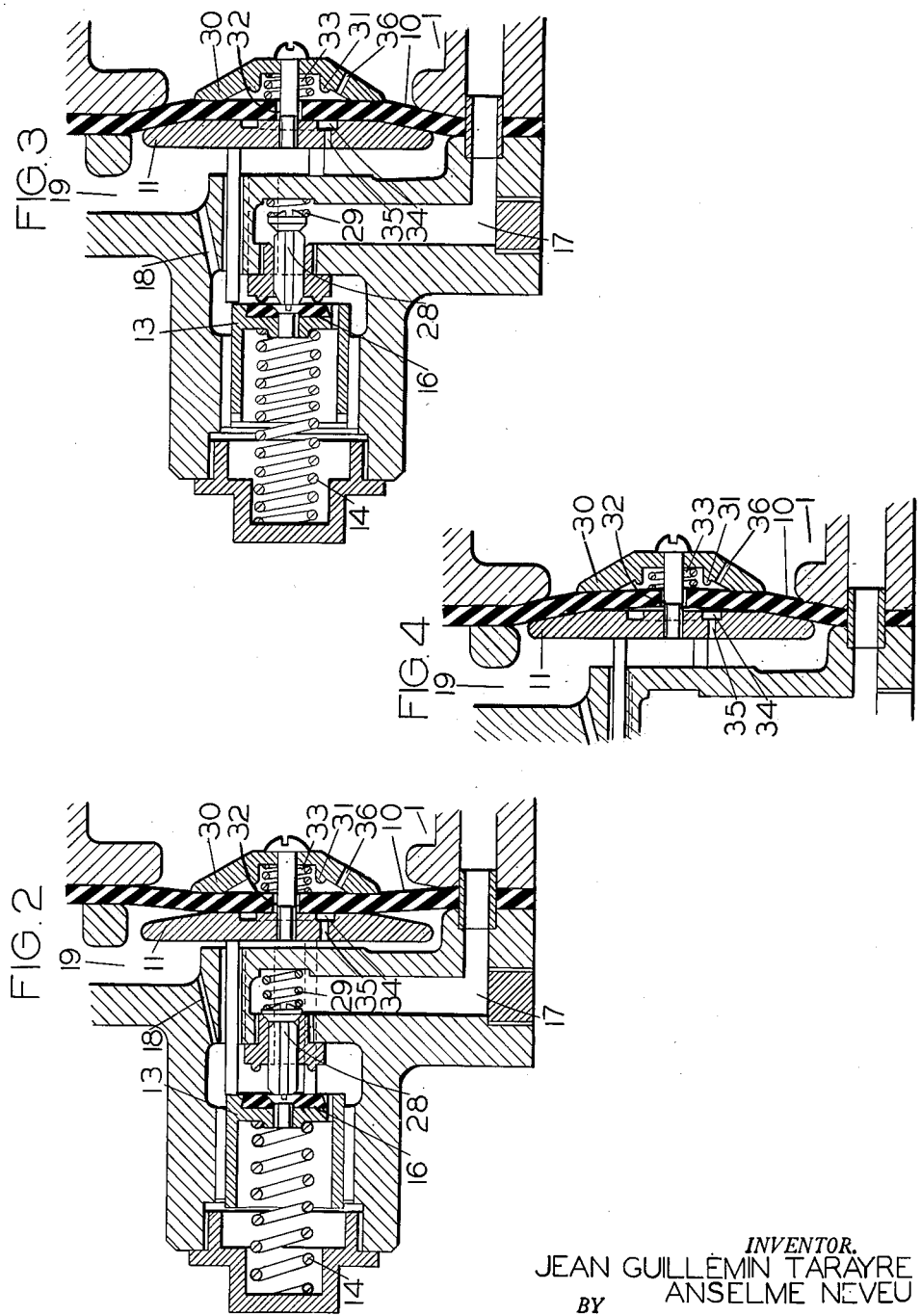

2,587,041

UNITED STATES PATENT OFFICE 2,587,041

TRIPLE VALVE DEVICE

Jean Guillemin-Tarayre, Paris, and Anselme Neveu, Livry-Gargan, France, assignors to Compagnie des Freins et Signaux Westinghouse, Paris, France Application February 26, 1948, Serial No. 11,285
In France May 9, 1944

Section 1, Public Law 690, August 8, 1946
Patent expires May 9, 1964

12 Claims. (Cl. 303—64)

The present invention relates to improvements in triple valves for automatic compressed air brake equipments, and relates more specifically to the charging of the auxiliary reservoirs.

The present method of charging the auxiliary reservoirs encounter two main difficulties which are experienced principally by reason of the length of the trains now in service. These difficulties are, first, the recharging of the auxiliary reservoirs is not uniform being charged through a single brake pipe which is supplied with fluid pressure only at the head end of the train. It follows that the auxiliary reservoirs at the head end of the train are overcharged while at the rear of the train they are undercharged. It is therefore desirable to retard the charging rate of the auxiliary reservoirs at the front end of the train and to accelerate the rate of charging at the rear portion of the train.

Second, when the engineer's brake valve is held in full release position for a prolonged period of time the brake pipe and the auxiliary reservoirs at the front end of the train will be overcharged (that is, these reservoirs will be charged in excess of the normal brake pipe pressure carried). Under this condition, an undesired application of the brake will occur at the front end of the train when the brake valve is moved to the running position in which the charging pressure to the brake pipe is controlled by the feed valve at the normal brake pipe pressure. It is, therefore, desirable to avoid this undesired brake application by affecting a restricted flow of auxiliary reservoir pressure to the brake pipe and thus obtain equality of pressures in the two volumes.

The present invention has for its object an improved control of the charging of the auxiliary reservoir, this improvement residing in the fact that no springs are required for controlling the operation of the triple valve piston.

Another object of the invention is a solution to the second above mentioned difficulty.

The present application presents the following features which may be considered either separately or in any combination:

First, between a passage connected to the auxiliary reservoir and a passage capable of being connected to the brake pipe, is located a valve device controlled by brake pipe and by auxiliary reservoir pressures and effective to cut off communication from the brake pipe to the auxiliary reservoir when the brake pipe pressure exceeds auxiliary reservoir pressure by a pre-determined amount.

Second, between a passage connected to the auxiliary reservoir and a passage capable of being connected to the brake pipe, a second valve device adopted to cut off communication between the said port when the brake pipe pressure does not exceed the auxiliary reservoir by a pre-determined lesser value.

Third, a valve device as described under First above, cooperating with a feed groove in the equalizing piston bushing such that the auxiliary reservoir may be charged either by the groove alone or by the groove and valve together, depending upon and selective by the degree of the excess of brake pipe pressure over the auxiliary reservoir pressure.

Fourth, a diaphragm mechanism located in the equalizing piston chamber opposite the piston and controlled by brake pipe and auxiliary reservoir pressures, for control of a valve mentioned in First and Second above, said diaphragm mechanism including two seat members and a spring, and operative, when the brake pipe pressure falls slightly below auxiliary reservoir pressure, to connect auxiliary reservoir pressure at a restricted rate to the brake pipe and thus destroy any overcharge of the auxiliary reservoir.

Other objects and advantages of the invention will appear in the following description when considered in connection with the attached drawings on which; Fig. 1 shows in diagrammatic sectional view a triple valve device embodying the features of the present invention.

Figs. 2, 3 and 4 are partial section diaphragms showing the features of improvement to the triple valve in larger scale.

By referring to Fig. 1, it will be seen that the equalizing piston 2 operates in a cylinder 1 in which a feed groove 3 is provided in the cylinder wall. This feed groove 3 is uncovered by the piston to permit communication between the brake pipe on the left hand side of the piston and the auxiliary reservoir on the slide valve side of the piston. The charging of the reservoir occurs as follows: brake pipe pressure entering the triple valve from the branch pipe 5, flows past the cock 6, through the filter 7, passage 8, to the piston chamber then by way of groove 3 to the slide valve chamber 9, then by way of passage 4 to the auxiliary reservoir.

At the left hand end of the equalizing piston cylinder 1 is located a diaphragm mechanism 10 comprising a diaphragm follower 11 having the push rods 12 for engaging a piston valve 13, which is normally held in the right hand position by a calibrated spring 14. The piston 13 carries a valve member 16 and is provided further with a choke 15 to allow auxiliary reservoir pressure to the spring side of the piston. The valve 16 is capable of controlling communication between a passage 17 which is sometimes connected to brake pipe and a passage 19 connected to the auxiliary reservoir. As will be seen by referring to the drawing, the passage 17 is connected to the seat of the equalizing slide valve 22 and then by passages 20 and 21, in the slide valve, to passage 23 in the casing to the brake pipe on the face of the equalizing piston, from here it is connected to the main brake pipe by the passage 8, the filter 7, the cock 6, and the branch pipe 5. It will be further noted that the passage 17 leading to the auxiliary charging means is adapted to be connected by a cavity 25 in the equalizing slide valve 22 to passage 26 leading to the atmosphere through a protected exhaust fitting 27 when the equalizing slide valve is in service position.

It will now be seen, by reference to Figs. 2, 3 and 4, that communication between passages 17 and 18 may be closed by the valve 28 when the valve 16 is moved to the extreme left hand position by the action of the diaphragm 10.

Another characteristic of this invention is included in the diaphragm 10 in that the central portion of the diaphragm, that is, the portion between the follower 11 and the plate 30, is deformable between two seat members separate from the other portion of the diaphragm. This diaphragm is urged toward the seat on member 11 by a spring 33 which has a value of approximately 1½ pounds per square inch over the diaphragm. The diaphragm will compress the spring 33 and seat against the seat 31 on the member 30 with an approximate differential on the diaphragm of 3 pounds per square inch. The function of this diaphragm is to connect the auxiliary reservoir pressure through port 35 in the follower plate 11, port 32 in the diaphragm and choke 36 to the equalizing piston chamber and to the brake pipe when a low differential of pressure exists between the auxiliary and the brake pipe, with the auxiliary pressure the higher. This feature permits any overcharge of auxiliary reservoir pressure, when moving the brake handle from full release to running position, to flow to the brake pipe and thereby avoid an undesired application of the brake.

The following is a description of the operation of this equipment together with the pointing out the above features as they are realized.

First of all, the combination of the valve 28 and of the feed groove 3 permits a uniform rate of recharge of the auxiliary reservoirs from brake pipe. At the front end of the train where brake pipe pressure is being restored, and the brake pipe pressure is high, the diaphragm 10 will overcome the force of spring 14 and move to the extreme left hand position in which the valve 28 is permitted to seat and the auxiliary reservoir charging rate will then be limited to the capacity of the feed groove.

At the rear portion of the train where the brake pipe pressure is not so high, the valve 28 will be open and brake pipe pressure can then flow to the auxiliary reservoir through the combined capacities of the valve 28 and the charging groove 3.

It is to be further noted that the control of communication between passages 17 and 19 is such that a gradual opening and closing of the valves 28 and 16 is accomplished, that is, upon initiating charging of the brake pipe 5, the diaphragm 10 will be gradually deflected against spring 14 by increasing brake pipe pressure acting on its right-hand face against opposing auxiliary reservoir pressure acting on its opposite face in accordance with the differential built up between said pressures and hence effect a gradual closing of valve 28 and opening of valve 16, while as the pressure in the auxiliary reservoir approaches that in the brake pipe the valve 16 will gradually close and valve 28 gradually open in accordance with the reduction in differential between the opposing pressures, this tapering or gradual control of the flow of fluid from the brake pipe to the auxiliary reservoir preventing creation of undesirable waves of pressure change in the brake pipe.

Considering now the mechanism of the central portion of the diaphragm 10 which is so arranged that under certain conditions the auxiliary reservoir pressure will reduce to the brake pipe to prevent undesired application of the brake when the auxiliary reservoir is overcharged by reason of the full release position of the brake valve. This slight overcharge of the auxiliary reservoir with respect to the brake pipe may further result from leakage in brake pipe pressure, and a failure of the feed valve to correct the leakage condition within the limits of operation of the equalizing piston. When this slight differential of pressures exist between the brake pipe and the auxiliary reservoir, say of 1½ to 2 pounds per square inch, the auxiliary reservoir pressure over the diaphragm 10 under the follower 11 will cause the diaphragm to compress the spring 33, as is shown in Fig. 4, and open a valve to permit pressure from the port 19 to flow through the port 35 in the follower 11, then through the port 32, between the diaphragm 10 and the pin securing the follower 11 to the plate 30, then through the restricted port 36 to the brake pipe. If the differential in pressure exceeds this pound and a half to two pounds such as when making a service brake application, the spring 33 is further compressed and the diaphragm seats against the seat member 31 to prevent further flow of the auxiliary reservoir pressure to the brake pipe.

This description and the drawings show only one embodiment of the above invention as applied to a triple valve device. It is to be understood that this invention may be applied to other types of triple valves and similar devices without parting from the spirit of the invention.

Having now described our invention, what we claim as new and desire to secure by Letters Patent, is:

1. In a fluid pressure brake control system, in combination with a brake pipe and an auxiliary reservoir, a brake controlling valve device subject to the opposing pressures in said brake pipe and auxiliary reservoir for controlling application and release of brakes, means also subject to the opposing pressures in said brake pipe and auxiliary reservoir and operative upon a chosen differential between said pressures upon a reduction in brake pipe pressure below auxiliary reservoir pressure to open a communication from said auxiliary reservoir to said brake pipe and operative to close said communication in response to a differential either greater or less than said chosen differential and means for defining said chosen differential.

2. In a fluid pressure brake control system, in combination with a brake pipe and an auxiliary reservoir, a brake controlling valve device subject to the opposing pressures in said brake pipe and auxiliary reservoir for controlling application and release of the brakes, a movable abutment subject to the opposing pressures in said brake pipe and auxiliary reservoir and valve means cooperative with said abutment upon a chosen differential between said opposing pressures upon a reduction in brake pipe pressure relative to pressure of fluid in said auxiliary reservoir to open a communication from said auxiliary reservoir to said brake pipe and to close said communication upon a differential either greater or less than said chosen differential and means cooperative with said abutment for determining said chosen differential.

3. In a fluid pressure brake control system, in combination with a brake pipe and an auxiliary reservoir, a brake controlling valve device subject to the opposing pressures in said brake pipe and auxiliary reservoir for controlling application and release of the brakes, a movable abutment subject to the opposing pressures in said brake pipe and auxiliary reservoir, two spaced apart valve seats, one at either side of said abutment for cooperation with said abutment in different positions thereof for controlling a communication from said auxiliary reservoir to said brake pipe and said abutment having a position between and disengaged from both of said seats for opening said communication and spring means acting on said abutment in opposition to pressure of fluid in the auxiliary reservoir for rendering said abutment to said position upon a chosen differential between said opposing pressures upon a reduction in brake pipe pressure relative to auxiliary reservoir pressure.

4. In a fluid pressure brake control system, in combination with a brake pipe and an auxiliary reservoir, a brake controlling valve device controlled by the opposing fluid pressures in said brake pipe and said auxiliary reservoir and operative upon an increase in brake pipe pressure to establish a communication from said brake pipe to said auxiliary reservoir, a slide valve operative by said brake controlling valve, another valve device subject to the opposing pressures in said brake pipe and auxiliary reservoir and cooperative with said slide valve to establish a second communication from said brake pipe to said auxiliary reservoir when brake pipe pressure exceeds auxiliary reservoir pressure by a chosen degree, said other valve device comprising means for opening a communication from said auxiliary reservoir to said brake pipe only when auxiliary reservoir pressure exceeds brake pipe pressure by a chosen degree, and means for determining the last named chosen degree.

5. In a fluid pressure brake control system, in combination with a brake pipe and an auxiliary reservoir, a brake controlling device controlled by the opposing fluid pressures in said brake pipe and auxiliary reservoir and operative upon an increase in brake pipe pressure to establish a communication from said brake pipe to said auxiliary reservoir, valve means for controlling a communication between said brake pipe and auxiliary reservoir controlled by said opposing fluid pressures and operative by a differential between said opposing fluid pressures in excess of a chosen degree and less than a chosen lower degree to close the last named communication and to open same at all other times and means to define said differential.

6. In a fluid pressure brake control system, in combination with a brake pipe and an auxiliary reservoir, a brake controlling valve device controlled by the opposing pressures in said brake pipe and auxiliary reservoir and operative upon an increase in brake pipe pressure to establish one communication from the brake pipe to the auxiliary reservoir and at the same time to open a second communication to said brake pipe, a second valve means subject to the opposing brake pipe and auxiliary reservoir pressures and operative upon a chosen differential therebetween to open said second communication to said auxiliary reservoir, and means operative upon operation of said brake controlling valve device in response to a reduction in brake pipe pressure to disconnect said second communication from said brake pipe.

7. In a fluid pressure brake control apparatus, in combination, a brake pipe, an auxiliary reservoir, means for establishing a fluid flow communication from said brake pipe to said auxiliary reservoir, two valves controlling another fluid flow communication between said brake pipe and said auxiliary reservoir which is separate from the first named communication, and means including movable abutment means subject opposingly to pressures of fluid in said brake pipe and auxiliary reservoir for first opening one of said valves and then closing the other valve in response to an increase in pressure of fluid in said brake pipe to a chosen degree over that in said auxiliary reservoir.

8. In a fluid pressure brake control apparatus, in combination, a brake pipe, an auxiliary reservoir, valve means operable in response to an increase in pressure of fluid in said brake pipe to a charging position for establishing a fluid flow communication from said brake pipe to said auxiliary reservoir, two valves cooperating with said valve means in said charging position thereof for controlling a fluid flow communication between said brake pipe and auxiliary reservoir which is separate from the first named communication, and means including movable abutment means subject opposingly to pressures of fluid in said brake pipe and auxiliary reservoir for first opening one of said valves and then closing the other valve in response to an increase in pressure of fluid in said brake pipe to a chosen degree over that in said auxiliary reservoir.

9. In a fluid pressure brake control apparatus, in combination, a brake pipe, an auxiliary reservoir, two valves for controlling flow of fluid to or from said auxiliary reservoir, means including movable abutment means subject opposingly to pressures of fluid in said brake pipe and auxiliary reservoir for first opening one of said valves and then closing the other valve in response to an increase in pressure of fluid in said brake pipe to a chosen degree over that in said auxiliary reservoir, valve means subject opposingly to pressures of fluid in said brake pipe and auxiliary reservoir and operable to one position in response to an increase in brake pipe pressure over that in said auxiliary reservoir to establish a fluid flow communication between said brake pipe and auxiliary reservoir and operable to another position when the pressure of fluid in said auxiliary reservoir exceeds that in said brake pipe and including means to selectively open the communication controlled by said two valves to said brake pipe in said one position of said valve means and to atmosphere in said other position of said valve means.

10. In a fluid pressure brake control system, the combination with a brake pipe and an auxiliary reservoir, of a brake controlling valve device operative upon an increase in pressure of fluid in said brake pipe over that in said auxiliary reservoir to open a communication for charging said reservoir with fluid under pressure from said brake pipe, valve means subject to the opposing pressures of fluid in said brake pipe and auxiliary reservoir and operative upon a reduction in pressure of fluid in said brake pipe to a chosen degree below that in said auxiliary reservoir to open a communication from said auxiliary reservoir to said brake pipe, and means for closing the last named communication at all other times.

11. In a fluid pressure brake control system, in combination, a brake pipe, an auxiliary reservoir, a brake controlling valve device controlled by opposing pressures of fluid in said brake pipe and auxiliary reservoir and operative upon an increase in brake pipe pressure over that in said auxiliary reservoir to establish a communication for charging said auxiliary reservoir with fluid under pressure from said brake pipe, said brake controlling valve device comprising a slide valve, a diaphragm subject to opposing pressures of fluid in said auxiliary reservoir and brake pipe, valve means controlled by said diaphragm and cooperative with said slide valve only when brake pipe pressure exceeds auxiliary reservoir pressure to establish a second communication for charging said auxiliary reservoir with fluid under pressure from said brake pipe, other valve means associated with and controlled by said diaphragm and operative only when auxiliary reservoir pressure exceeds by a chosen degree the pressure of fluid in said brake pipe to establish a communication for flow of fluid under pressure from said auxiliary reservoir to said brake pipe, and means for closing the last named communication at all other times.

12. In a fluid pressure brake control system, in combination with a brake pipe and an auxiliary reservoir, a brake controlling valve device controlled by opposing fluid pressures in said brake pipe and auxiliary reservoir and operative upon an increase in pressure of fluid in said brake pipe to establish a communication from said brake pipe to said auxiliary reservoir and to at the same time establish a second communication open to said brake pipe, valve means and a second valve means cooperative to control communication between said second communication and said auxiliary reservoir, movable abutment means operative in response to a chosen differential in brake pipe pressure over auxiliary reservoir pressure to operate said valve means to open said second communication to said auxiliary reservoir and operative upon a different differential between pressures in said brake pipe and auxiliary reservoir to effect operation of one or the other of said valve means to close communication between said second communication and said auxiliary reservoir, and means to determine said chosen differential of pressures.

JEAN GUILLEMIN-TARAYRE.
ANSELME NEVEU.

REFERENCES CITED

The following references are of record in the file of this patent:

UNITED STATES PATENTS

| Number | Name | Date |
|---|---|---|
| 1,094,945 | Snyder | Apr. 28, 1914 |
| 1,089,575 | Neal | Mar. 10, 1914 |
| 1,854,722 | Tarisien | Apr. 19, 1932 |
| 1,986,468 | Farmer | Jan. 1, 1935 |
| 2,015,785 | Campbell | Oct. 1, 1935 |
| 2,054,855 | Farmer | Sept. 22, 1936 |